April 4, 1939.  W. C. ROBINETTE  2,152,921
APPARATUS FOR MAKING MOTION PICTURES
Filed Feb. 26, 1936  3 Sheets-Sheet 1
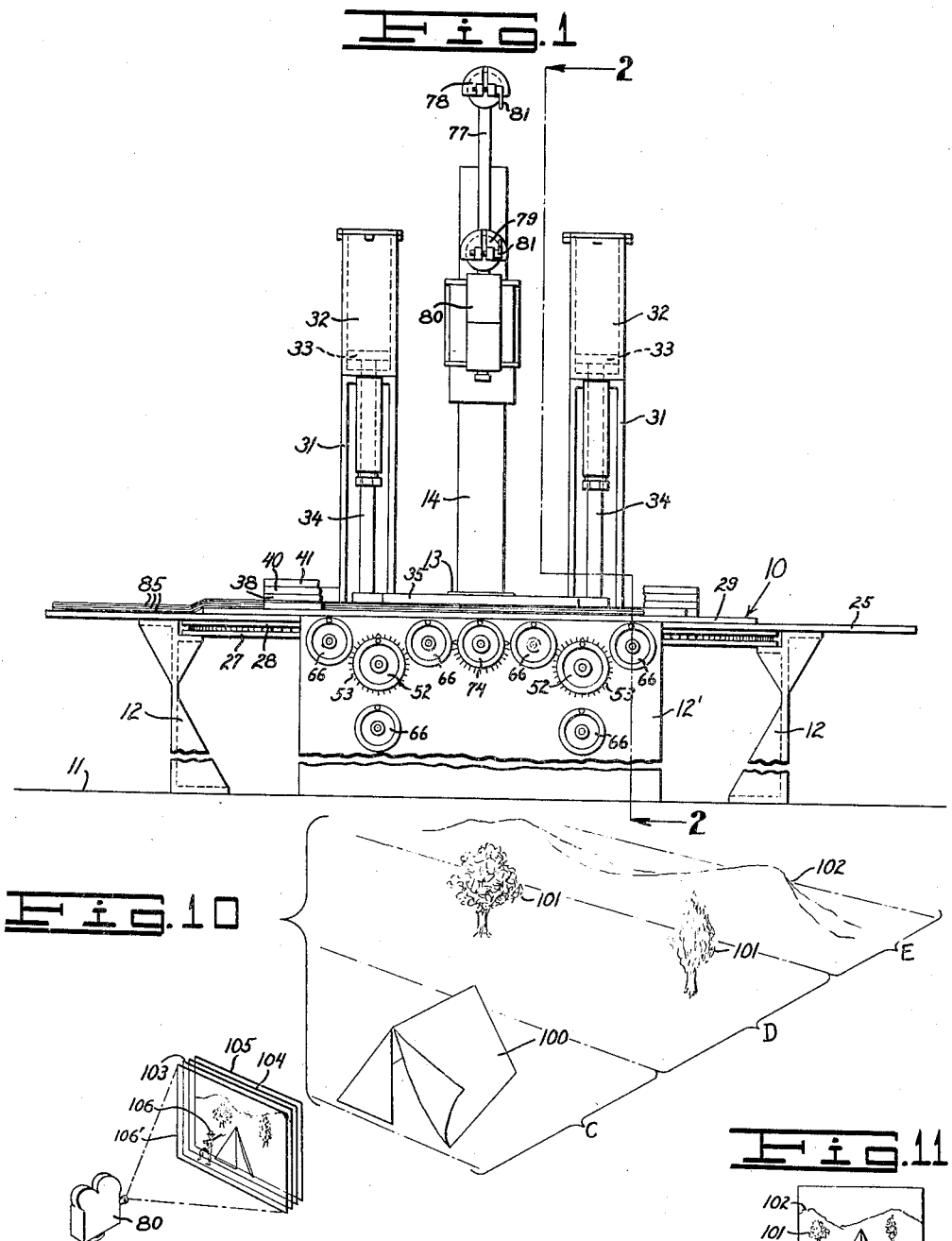
INVENTOR.
WILLARD C. ROBINETTE
BY
ATTORNEY.

April 4, 1939.  W. C. ROBINETTE  2,152,921
APPARATUS FOR MAKING MOTION PICTURES
Filed Feb. 26, 1936  3 Sheets-Sheet 2
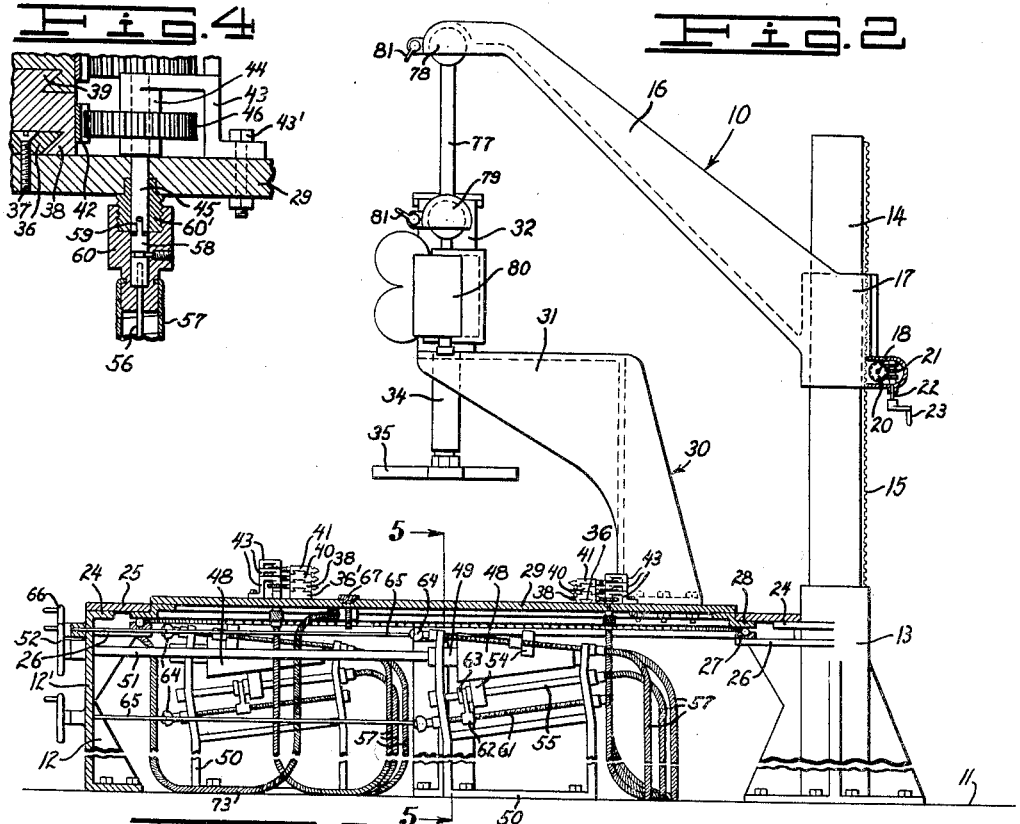
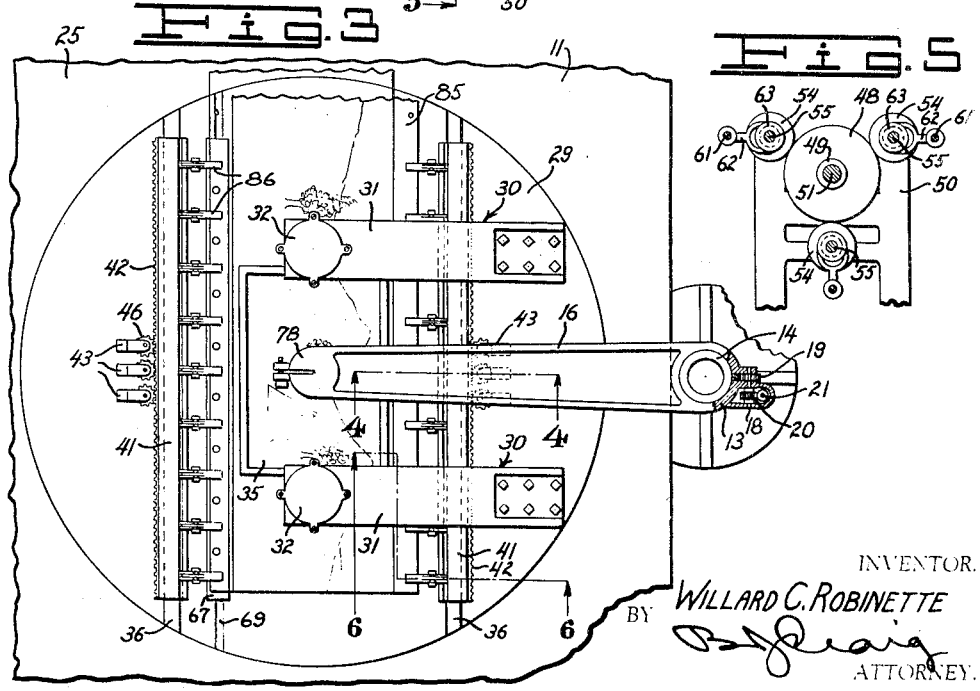
INVENTOR.
WILLARD C. ROBINETTE
BY
ATTORNEY.

April 4, 1939.  W. C. ROBINETTE  2,152,921
APPARATUS FOR MAKING MOTION PICTURES
Filed Feb. 26, 1936  3 Sheets-Sheet 3
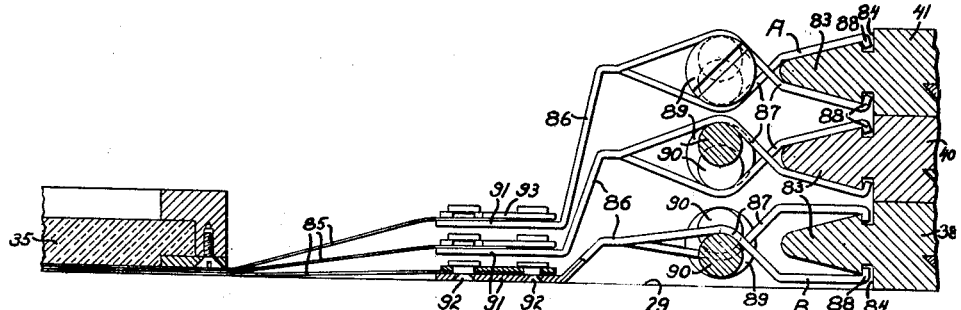
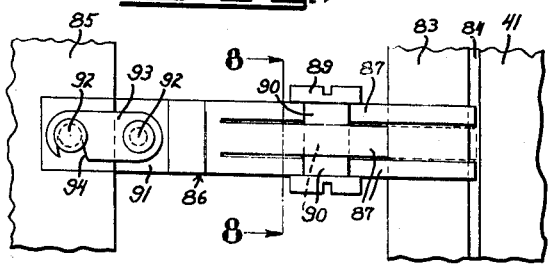
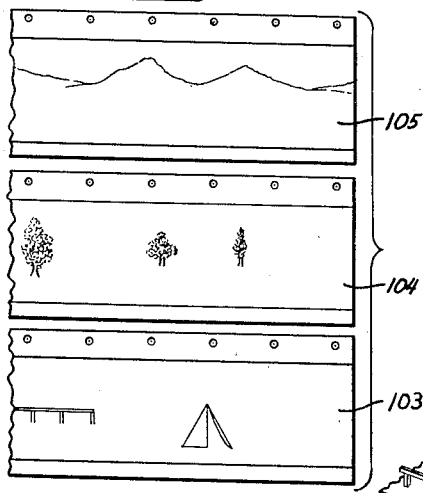
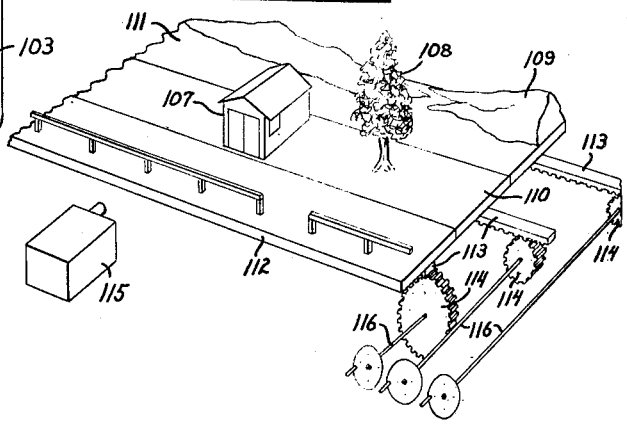
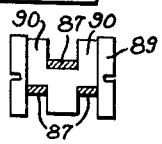
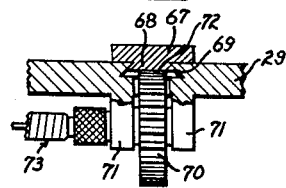
INVENTOR.
BY WILLARD C. ROBINETTE
ATTORNEY.

Patented Apr. 4, 1939

2,152,921

UNITED STATES PATENT OFFICE 2,152,921

APPARATUS FOR MAKING MOTION PICTURES

Willard C. Robinette, Pasadena, Calif.

Application February 26, 1936, Serial No. 65,799

3 Claims. (Cl. 88—16)

This invention relates to an apparatus for making motion pictures.

In the motion picture art and in cartoon work any stationary view or scene may be satisfactorily represented by a planar representation that observes correct perspective of the component parts. In case, however, the view point be a moving one, i. e. having a velocity of translation respective to the scene or view, then the criterion of naturalness being fulfilled by correct perspective alone no longer applies.

In the natural observance of three dimensional scenes, parallax subconsciously, in addition to the effort of eye focusing, affects the observer's idea and conception of the third dimension since he is aware that as he moves close objects go by him with a greater apparent velocity than more remote objects. Moreover, the apparent angular speed with which a body goes past the observer is only a function of his velocity and the distance between the observer and the body.

Thus for example, from a train window close objects appear to be receding at a rapid rate, while a distant mountain range appears to move very slowly. An important thing to note is that for this translation of scene, or moving picture, the parallax relationships of objects in the view is fully as important to the correct natural interpretation of the scene as is the correct perspective relationships of the component objects.

The object of my invention is therefore to provide an apparatus whereby the component parts of any scene or view shall have a parallax motion when the view point undergoes a translational motion.

I have found it sufficient to divide the objects in broad zones as regards the apparent distance from the path of translation, and then move these zones, or planar representations in which the correct perspective relations are maintained, in front of the camera, parallel to the line of translation or view, in a direction opposite to that of the apparent motion.

Thus the camera or viewpoint may remain stationary while actors, or representations of actors or motions, move in front of the camera. In the background the differentially moving planar representations, or models, of scenes move, each observing correct perspective and parallax relationships. The complete effect on the screen of the projected picture is the apparent translation of the actors through a three-dimensional scene.

A specific object of my invention is to provide a motion picture apparatus wherein backgrounds in different planes are moved at different relative speeds.

Another object of the invention is to provide a motion picture apparatus including a camera support and a cell support adapted to support a plurality of backgrounds with means to cause the backgrounds to move at different speeds.

Another object of the invention is to provide a motion picture apparatus including a series of backgrounds and means to move each of the backgrounds at a speed which is inversely proportional to the apparent visual distance of the objects represented on that background, and directly proportional to the absolute distance of that background from the actual camera position, and which is also directly proportional to the apparent translational velocity of the observer desired in the projected picture.

Other objects and the advantages of this invention will be apparent from the following description taken in connection with the accompanying drawings, wherein:

Fig. 1 is a front elevation showing my apparatus;

Fig. 2 is a section taken on line 2—2 of Fig. 1;

Fig. 3 is a fragmentary top plan view showing my apparatus;

Fig. 4 is an enlarged, fragmentary, sectional view taken on line 4—4 of Fig. 3 and showing the rack driving gears;

Fig. 5 is an enlarged, fragmentary, sectional view taken on line 5—5 of Fig. 2;

Fig. 6 is an enlarged, fragmentary, sectional view taken on line 6—6 of Fig. 3;

Fig. 7 is a top plan view showing a cell clip;

Fig. 8 is a section taken on line 8—8 of Fig. 7;

Fig. 9 is a fragmentary, sectional view, partly in elevation, showing the bar drive mechanism;

Fig. 10 is a perspective view of the arrangement of zones;

Fig. 11 is a top plan view showing the superimposed cells;

Fig. 12 is a perspective view showing a motion picture camera and the cells;

Fig. 13 is a fragmentary plan view showing the cells; and

Fig. 14 is a fragmentary, perspective view showing the arrangement of slides with the camera for photographing objects upon the slides.

Referring to the drawings by reference character I have shown my invention as embodied in an apparatus which is indicated generally at 10. As shown the apparatus includes a base 11 from which uprights 12 extend. On one side a cylindrical member 13 is provided and in this member a post 14 which includes a rack 15 is supported. A panel 12' is provided between the uprights 12.

Mounted upon the post 14 I show a crane 16 which is provided with a body 17 slidably engaging the post 14. The body 17 has a shaft 18 journaled therein and this shaft has a gear 19 keyed thereon which gear engages the rack 15. The shaft also has a worm wheel 20 keyed thereon and this worm wheel 20 engages a worm 21 mounted on a shaft 22 which has a handle 23 thereon. The construction is such that when the handle 23 is rotated the crane is moved vertically.

The uprights 12 and the cylindrical member 13 have flanges 24 thereon which support a table 25. The members 12 and 13 also have other flanges 26 thereon which support a ball race 27. This ball race supports a turn table base 28. This turn table base 28 in turn supports a turn table 29 which is disposed slightly above the top of the table 25.

Mounted on the turn table 29 I show a pair of brackets 30 each of which includes an offset portion 31 which extend parallel to each other and which support at their ends cylinders 32. Each of the cylinders is provided with a piston 33 and a piston rod 34. The piston rods 34 engage a transparent hold down frame 35 which is rectangular in cross section as shown in Fig. 3. The cylinders 32 are connected to a suitable source of fluid pressure and are arranged to operate in unison and the fluid is admitted at each end of the cylinders so that the raising and lowering of the hold down frame may be accomplished.

Mounted upon the turn table 29 I show a dovetail 36 which is held on the table by screws 37 (see Fig. 4). Spaced from the dovetail 36 I provide a dovetail rail 36' which is similar to the dovetail 36 except that it includes a rail portion upon the base thereof. The dovetail 36 and the dovetail rail 36' are each engaged by a superimposed dovetailed rail 38 which is provided at its upper surface with a dovetail 39. This dovetail in turn supports a rail 40 which is similar in all respects to the rail 38 and the rail 40 supports a further rail 41 which is similar to the rails 38 and 40 except that the upper dovetailed portion 39 is omitted. In the accompanying drawings I have disclosed three of the rails, but it also will be understood that this number could be varied to suit the requirements in each installation. The rails 38, 40, and 41 are arranged on opposite sides of the hold down 35 and on the side remote from the hold down each rail is provided with a rack 42. Adjacent each of the racks I provide bracket members 43 which are suitably secured to the turn table as by a bolt 43' and each bracket member includes a bearing 44 for a shaft 45 on which a pinion 46 is mounted. The brackets are arranged side by side as shown in Fig. 3 and each of the pinions 46 engage one of the racks 42 so that when the pinions are rotated in either direction the associated racks are moved in accordance with the direction in which the pinion is moved. Thus it will be seen that one pinion may be rotated in one direction to move one rack in one direction while the adjacent pinion may be rotated in a different direction at a reverse speed to move a rack in a different direction to cause an entirely different movement of the other rail.

In order to drive the pinions 46 and thereby shift the racks I provide a drive mechanism under each side of the turn table. This drive mechanism includes cone members 48 positioned on shafts 49 which are mounted on supports 50 secured to the base 11. A rod 51 extends from the shaft 49 to the panel 12' where a hand wheel 52 is secured thereto. Suitable indicia 53 is provided on the panel 12' to indicate the position of the cones 48.

A plurality of friction wheels 54 are secured in engagement with the cones 48 upon splined shafts 55 which extend parallel to the adjacent surface of the cone 48 and are mounted in the supports 50. One end of each of the shafts 55 is secured to the core 56 of a flexible drive cable 57 which is secured to the support 50. The other end of the core 56 includes a tongue member 58 which engages a slot 59 in the shaft 45. The cable 57 is secured by a removable nut 60 to a threaded bushing 60' secured to the table 29.

A threaded shaft 61 is mounted in the support 50 adjacent and parallel to each of the shafts 55 and has a yoke 62 mounted thereon. The yoke 62 engages a slotted hub 63 which is integral with the wheel 54. One end of each of the shafts 61 is connected by a universal joint 64 to a rod 65 the other end of which is positioned in the panel 12' and has a hand wheel 66 secured thereto.

A bar 67 includes a dovetail 68 which is slidably positioned in a dovetail 69 in the table 29 (see Fig. 9). A gear 70 is rotatably mounted on brackets 71 integral with the table 29. The gear 70 meshes with a rack 72 located on the dovetail 68. A flexible drive cable 73 has one end secured to the gear 70 and the other end is secured to a hand wheel 74 mounted on the panel 12'. Suitable indicia are provided on the panel 12' to indicate the position of the bar 67.

A rod 77 has one end thereof secured by a ball joint 78 to the crane 16 and has the other end thereof secured as by a ball joint 79 to a motion picture camera 80. The ball joints 78 and 79 each include a clamp screw 81 to secure them in adjusted position.

Each of the bars 38, 40, and 41 includes a double bevelled edge 83 which has a pair of slots 84 therein. In order to adjustably secure the Celluloid sheets or cells 85 to the bars 38, 40, and 41 I provide a plurality of clips 86 each of which includes a plurality of tongues 87 which are bent as shown in Fig. 6 and include hook portions 88 which engage the slots 84. A spreader 89 includes eccentric portions 90 which are positioned between the tongues 87 to hold them in one position in tight engagement with the edge 83 as shown at A in Fig. 6 and in another position to allow them to spread as shown at B in Fig. 6.

The free end of each of the clips 86 is provided with a horizontal portion 91 in which is positioned a pair of rivets 92. A latch 93 is pivotally mounted on one of the rivets 92 and is slotted as at 94 to engage the other of the rivets 92. In use the latches are swung to one side and a cell is arranged with its apertures engaging the rivets 92. The latches are then moved to the position shown in Fig. 7 so that the cells are held assembled.

In Fig. 10 I depict a background consisting of a tent 100, trees 101, and a mountain range 102. In practice the source for such a background may be fanciful or actual and in making a background, according to my method, the tent is assumed to be in a zone which is designated C, the trees are in a zone designated D, while the mountain range is in a zone designated E. In the practice of my invention the tent is placed upon a cell 103 as shown in Fig. 13, while the trees are drawn upon a cell 104, and the mountains are drawn upon a cell 105.

These cells are superimposed so that they appear as indicated in Fig. 11 wherein the tent, trees, and mountains are all observed. The cells 103, 104, and 105 are connected by clips to the proper rails and the drive for the rails is so adjusted that the respective rails having the cells thereon are moved step by step a distance which is inversely proportional to the assumed distance from the camera which is indicated at 80 in Fig. 12. In the drawings the cells are shown as vertically arranged, but preferably the cells are horizontal when photographed. A suitable action figure 106 may be placed on a cell 106' in front of the cells 103, 104, and 105 so that there will be an action figure in addition to the background.

In Fig. 14 instead of drawing the various features of the background on individual cells I provide a cut-out or built-up background. As shown this built-up background consists of a house 107 beside which a cardboard tree 108 is mounted. On the background, mountains 109 appear. In this case the house and trees are mounted on a slide 110 while the mountains are mounted on a slide 111. A foreground slide 112 may be provided.

On this slide 112 an action figure may be arranged. The slides 110, 111, and 112 are provided with racks 113 which are driven by pinions 114 and the size of the pinions is preferably of a decreasing ratio from the camera 115 so that when shafts 116 connected to the gears 114 are rotated each through the same angle the correct movement of the background will be provided.

From the foregoing description it will be apparent that I have provided a novel apparatus for making motion pictures which is simple in construction and highly efficient in use.

Having thus described my invention I claim:

1. In a motion picture apparatus, a base, a table on said base, a plurality of slidably mounted parallel background cell engaging members on said table, and means to move said background cell engaging members, said means including a cone member adapted to be rotated, a plurality of wheels engaging said cone and adapted to be rotated thereby, means to independently shift said wheels along said cone, a rack on each of said cell engaging members, a gear engaging each of said racks, and means connecting said wheels to said gears.

2. In a device for producing animated cartoons, a table, a plurality of superimposed members slidably mounted on said table, each of said members having grooves in opposite sides thereof, a plurality of clips, each of said clips comprising a pair of spaced members each having an end portion fitting in one of said grooves, each of said clips including cam means for urging said end portions into the grooves, each of said clips having a bent end portion, said end portions having horizontal extremities, a pair of rivets on each of said horizontal extremities, a latch member pivotally mounted on one of said rivets, said latch member including a notched portion engaging the other rivet.

3. In a motion picture apparatus, a base, a table on said base, a plurality of parallel spaced and aligned background cell engaging members, means to mount said cell engaging members on said table for movement parallel to each other and means to move said background cell engaging members, said moving means including a driving member, means to actuate the driving member, a plurality of driven members, means connecting the driving member to the driven members and comprising a plurality of speed changing mechanisms each adapted to vary the speed of the corresponding driven member without varying the speed of the other driven members, a rack on each of said cell engaging members, a gear engaging each of said racks, and means connecting each of said gears to an associated driven member.

WILLARD C. ROBINETTE.